United States Patent
Dufour et al.

(10) Patent No.: US 10,526,505 B2
(45) Date of Patent: ***Jan. 7, 2020

(54) COMPOSITION FOR AN ORGANIC GEL AND THE PYROLYSATE THEREOF, PRODUCTION METHOD THEREOF, ELECTRODE FORMED BY THE PYROLYSATE AND SUPERCAPACITOR CONTAINING SAME

(71) Applicant: Hutchinson, Paris (FR)

(72) Inventors: Bruno Dufour, Champagne sur Seine (FR); Yannick Bureau, Ferrieres en Gâtinais (FR); Hugo Dorie, Montargis (FR); Pierre-Axel Parodat, Mormant-sur-Vernisson (FR); Philippe Sonntag, Avon (FR)

(73) Assignee: Hutchinson, Paris (FR)

( * ) Notice: Subject to any disclaimer, the term of this patent is extended or adjusted under 35 U.S.C. 154(b) by 181 days.

This patent is subject to a terminal disclaimer.

(21) Appl. No.: 14/435,549

(22) PCT Filed: Oct. 8, 2013

(86) PCT No.: PCT/IB2013/059206
§ 371 (c)(1),
(2) Date: Apr. 14, 2015

(87) PCT Pub. No.: WO2014/060904
PCT Pub. Date: Apr. 24, 2014

(65) Prior Publication Data
US 2015/0299508 A1    Oct. 22, 2015

(30) Foreign Application Priority Data
Oct. 17, 2012 (FR) ..................... 12 59892

(51) Int. Cl.
*C09D 161/00* (2006.01)
*H01G 11/04* (2013.01)
(Continued)

(52) U.S. Cl.
CPC .......... *C09D 161/00* (2013.01); *H01G 11/04* (2013.01); *H01G 11/28* (2013.01); *H01G 11/32* (2013.01); *H01G 11/62* (2013.01)

(58) Field of Classification Search
CPC ...... C09D 161/00; C01B 31/02; H01G 11/04; H01G 11/32; H01G 11/28; E04B 1/76;
(Continued)

(56) References Cited

U.S. PATENT DOCUMENTS 3,775,158 A * 11/1973 Gallagher .............. C08G 18/58
156/307.5
4,873,218 A    10/1989 Pekala
(Continued)

FOREIGN PATENT DOCUMENTS

EP        2 080 736 A1    7/2009
KR    2009 0118200 A    11/2009
(Continued)

OTHER PUBLICATIONS

International Search Report and Written Opinion for Application No. PCT/IB2013/059206 dated Feb. 25, 2014.
(Continued)

*Primary Examiner* — Jane L Stanley
(74) *Attorney, Agent, or Firm* — Alston & Bird LLP

(57) ABSTRACT

A non-crosslinked, gelled carbonaceous composition and a pyrolyzed composition respectively forming an aqueous polymer gel and the pyrolysate thereof in the form of porous carbon is provided. Also provided is a production method thereof, to a porous carbon electrode formed by the pyrolyzed composition, and to a supercapacitor containing the (Continued)

electrodes. The gelled, non-crosslinked composition (G2) is based on a resin created at least partly from polyhydroxybenzene(s) R and formaldehyde(s) F and comprises at least one hydrosoluble cationic polyelectrolyte P. The composition forms a rheofluidifying physical gel. A pyrolyzed carbonaceous composition having a carbon monolith, is the product of coating, crosslinking, drying then pyrolysis of the non-crosslinked gelled composition, the carbon monolith being predominantly microporous and able to form a supercapacitor electrode having a thickness of less than 1 mm.

11 Claims, 1 Drawing Sheet

(51) Int. Cl.
*H01G 11/28* (2013.01)
*H01G 11/32* (2013.01)
*H01G 11/62* (2013.01)

(58) Field of Classification Search
CPC . C08J 3/075; C08J 9/28; B01J 13/0091; B01J 13/0065
USPC .............. 524/596; 252/62; 521/50
See application file for complete search history.

(56) References Cited

U.S. PATENT DOCUMENTS

| | | | |
|---|---|---|---|
| 5,744,510 A | 4/1998 | Pekala | |
| 5,877,100 A * | 3/1999 | Smith | B01J 13/00 501/12 |
| 6,297,293 B1 * | 10/2001 | Bell | B01J 20/20 423/445 R |
| 6,356,432 B1 | 3/2002 | Danel et al. | |
| 6,737,445 B2 | 5/2004 | Bell et al. | |
| 7,167,354 B2 | 1/2007 | Dietz et al. | |
| 7,811,337 B2 | 10/2010 | Zhong et al. | |
| 8,889,751 B2 * | 11/2014 | Liu | B29C 67/202 521/154 |
| 2004/0241237 A1 * | 12/2004 | Pirard | B01J 21/18 424/484 |
| 2007/0146967 A1 | 6/2007 | Xi et al. | |
| 2008/0103227 A1 | 5/2008 | Yun et al. | |
| 2009/0036557 A1 | 2/2009 | Ratke et al. | |
| 2009/0059474 A1 * | 3/2009 | Zhamu | H01G 11/46 361/503 |
| 2010/0288160 A1 * | 11/2010 | Maisels | C01B 32/00 106/31.13 |
| 2011/0024698 A1 | 2/2011 | Worsley et al. | |
| 2011/0278755 A1 * | 11/2011 | Liu | A61L 27/16 264/41 |
| 2012/0020869 A1 | 1/2012 | Scherdel et al. | |
| 2013/0153830 A1 * | 6/2013 | Seo | C01B 13/32 216/56 |
| 2015/0267400 A1 | 9/2015 | Swoboda et al. | |
| 2015/0299508 A1 | 10/2015 | Dufour et al. | |
| 2017/0007975 A1 | 1/2017 | Dufour et al. | |
| 2017/0029574 A1 * | 2/2017 | Bureau | C01B 32/382 |
| 2017/0133714 A1 * | 5/2017 | Ayme-Perrot | C08J 3/09 |
| 2017/0174576 A1 * | 6/2017 | Swoboda | C04B 38/0032 |

FOREIGN PATENT DOCUMENTS

| | | |
|---|---|---|
| WO | WO 2005/056643 A2 | 6/2005 |
| WO | WO 2010/000778 A1 | 1/2010 |
| WO | WO 2014/060906 A1 | 4/2014 |

OTHER PUBLICATIONS

Bruno, M. M. et al., *A Novel Way to Maintain Resorcinol-Formaldehyde Porosity During Drying: Stabilization of the Sol-Gel Nanostructure Using a Cationic Polyelectrolyte*, Colloids and Surfaces A: Physicochemical and Engineering Aspects, 362 (2010) 28-32.
Bruno, M. M. et al., *Characteriziation of Monolithic Porous Carbon Prepared From Resorcinol/Formaldehyde Gels With Cationic Surfactant*, Colloids and Surfaces A: Physicochemical and Engineering Aspects, 358 (2010) 13-20.
Chaijitrsakool, T. et al., *Effects of Pore Characters of Mesoporous Resorcinol-Formaldehyde Carbon Gels on Enzyme Immobilization*, Journal of Molecular Catalysis B: Enzymatic, 55 (2008) 137-141.
Balach, J., et al.; "A direct and quantitative image of the internal nanostructure of nonordered porous monolithc carbon using FIB nanotomography"; Journal of Microsopy; 246:3(2012) 274-278.
Balach, J., et al.; "Facile preparation of hierarchical porous carbons with tailored pore size obtained using a cationic polyelectrolyte as a soft template"; Colloids and Surfaces A: Physicochemical Engineering Aspects 415(2012) 343-348.
Bruno, M., et al.; "Hierarchical Porous Materials: Capillaries in nanoporous carbon"; Functional Materials Letters 2:3(2009) 135-138.
Office Action from corresponding Japanese Patent Application No. 2015-537384, dated Oct. 10, 2017, 6 pages.
Pekala, R. W. et al., *New Organic Aerogels Based Upon a Phenolic-Furfural Reaction*, Journal of Non-Crystalline Solids 188 (1995) 34-40.

* cited by examiner

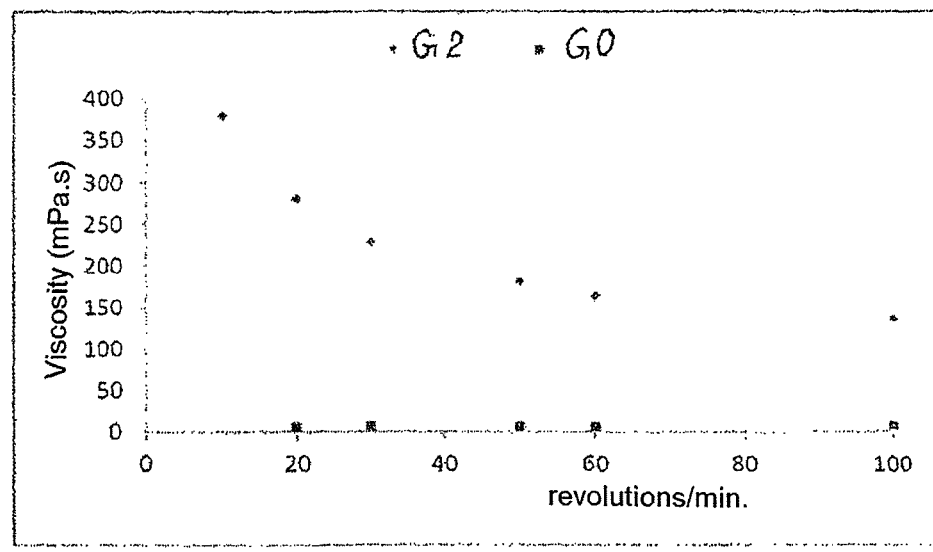

COMPOSITION FOR AN ORGANIC GEL AND THE PYROLYSATE THEREOF, PRODUCTION METHOD THEREOF, ELECTRODE FORMED BY THE PYROLYSATE AND SUPERCAPACITOR CONTAINING SAME

FIELD

The present invention relates to a non-crosslinked gelled carbon-based composition and to a pyrolyzed composition respectively forming an organic polymer gel and its pyrolysate in porous carbon form, to the process for preparing same, to a porous carbon electrode consisting of this pyrolyzed composition and to a supercapacitor incorporating such electrodes. The invention applies in particular to supercapacitors that are suitable for equipping electric vehicles.

BACKGROUND

Supercapacitors are electrical energy storage systems which are particularly advantageous for applications requiring the conveyance of high-power electrical energy. Their ability to rapidly charge and discharge and the increased lifetime compared with a high-power battery make them promising candidates for a number of applications. Supercapacitors generally consist of the combination of two conductive porous electrodes having a high specific surface area, which are immersed in an ionic electrolyte and separated by an insulating membrane known as a "separator", which allows ionic conductivity and prevents electrical contact between the electrodes. Each electrode is in contact with a metal current collector, making possible exchange of the electric current with an external system. Under the influence of a potential difference applied between the two electrodes, the ions present within an electrolyte are attracted by the electrode surface exhibiting an opposite charge, thus forming an electrochemical double layer at the interface of each electrode. The electrical energy is thus stored electrostatically by charge separation. The expression of the capacitance C of a supercapacitor is identical to that of a conventional capacitor, namely:

$C = \varepsilon \cdot S/t$, where $\varepsilon$ denotes the permittivity of the medium, S the surface area occupied by the double layer, and t the thickness of the double layer.

The capacitances achievable within supercapacitors are nevertheless much higher than those commonly achieved by conventional capacitors, as a result of the use of carbon-based electrodes with a maximized specific surface area and of the extreme thinness of the electrochemical double layer (typically a few nanometers thick). These carbon-based electrodes must necessarily be conductive in order to provide transportation of the electric charges, porous in order to provide transportation of the ionic charges and the formation of the electrical double layer over a large surface area, and chemically inert in order to prevent any energy-consuming parasitic reactions.

The energy E stored within a supercapacitor is defined according to the conventional expression for capacitors, i.e.:

$E = \frac{1}{2} \cdot C \cdot V^2$, where $V$ is the potential of the supercapacitance.

The capacitance and the potential are therefore two essential parameters which it is necessary to optimize in order to promote energy performance levels. The capacitance depends on the porous texture really accessible by the electrolyte. As it happens, for applications in transportation and in particular for an electric vehicle, it is necessary to have a high energy density in order to limit the on-board weight of the supercapacitor, which imposes having a high mass capacitance.

The potential of a supercapacitor depends mainly on the nature of the electrolyte used, which may be organic or aqueous.

There are various possibilities for incorporating the active material into a supercapacitor electrode. Documents U.S. Pat. No. 6,356,432, US-A1-2007/0146967 and U.S. Pat. No. 7,811,337 describe the dispersion of conductive porous carbons in a non-active organic binder and a solvent, then the coating of the paste obtained on the current collector. This method has the drawback of using a binder which makes the system heavy without being active for storing energy.

In the context of an application for an electric vehicle, it is favorable to use, as electrode active material, a carbon monolith in an aqueous electrolyte, in order to maximize the specific energy of this electrode. In order to achieve operation at high powers typically greater than 1 kW/kg, it is necessary for the carbon monolith to be very thin, having a thickness of only a few hundred micrometers and usually less than or equal to 0.5 mm, while being sufficiently robust so as not to be brittle and to not deform at these very small thicknesses.

For the preparation of such a carbon monolith for supercapacitor electrodes, pyrolysis of resorcinol/formaldehyde (RF) gels is usually carried out. The RF resins are in fact particularly advantageous for the preparation of carbon with a high porosity in monolith form, since they are very inexpensive, can be used in water and make it possible to obtain various porosities and densities according to the preparation conditions.

However, since the mixture of resorcinol R and formaldehyde F precursors in water has a very low viscosity, it cannot be coated with a sufficiently small thickness, i.e. typically less than 1 mm, and, instead of such a coating, it is chosen to have the mixture of R and F precursors in a closed mold so as to form a gel after polymerization reaction. In order to limit the adhesion of the mixture to the walls of the mold, it is necessary to provide this mold with a typically fluorinated, non-stick coating, which generates a high production cost.

Another drawback of the existing RF gels for supercapacitor electrodes is that they are chemical gels which are by definition irreversible, since they are obtained by polycondensation of the liquid precursors in the mold. Consequently, once formed, the gel cannot be reused. Furthermore, at high conversion, this gel becomes hydrophobic and precipitates out, which induces mechanical stresses in the material and therefore a greater fragility. Thus, it is necessary to use a method for drying the water present in the gel that is sufficiently mild to prevent fracturing or contraction of the gelled structure, such as supercritical drying (for the formation of an aerogel), lyophilization (for the formation of a cryogel), or very slow drying in a humid chamber (for obtaining a xerogel). The dried gel is then pyrolyzed under nitrogen at high temperature so as to obtain a monolithic porous carbon.

As it happens, one limitation of the current methods is the deformation of the monoliths during pyrolysis, due to the residual stresses when the gel thickness is less than 2 mm. As it happens, in order to obtain carbon electrodes having the abovementioned thickness less than or equal to 0.5 mm, these methods must also comprise a final polishing/rectifying step which has the drawback of being expensive and difficult to implement, and of generating considerable losses of material.

By way of illustration of the prior art presented above for the preparation of monolithic carbons derived from RF gels for supercapacitor electrodes, mention may be made of document U.S. Pat. No. 6,737,445 which teaches the use of a high amount of a cationic, anionic or nonionic surfactant for forming an emulsion in water and polymerizing therein the R and F precursors. An irreversible aqueous chemical gel is obtained which is incapable of being coated with a small thickness, and after drying of this gel under a gas stream and pyrolysis, a mesoporous carbon-based structure, the size of the pores of which corresponds to micelles, is obtained.

Another drawback of this process lies in the mesoporous structure obtained for the carbon which, in the case of a supercapacitor, is unfavorable in comparison with a mainly microporous structure which is preferred for having a high specific energy and a high capacitance. Furthermore, the use of a large amount of surfactant proves to be expensive.

It is also possible to mention, by way of prior art for the preparation of such electrodes, the article "A novel way to maintain resorcinol-formaldehyde porosity during drying: Stabilization of the sol-gel nanostructure using a cationic polyelectrolyte, Mariano M. Bruno et al., 2010", which discloses a mesoporous monolithic carbon derived from an RF aqueous chemical gel comprising, in addition to a sodium carbonate-based basic catalyst C, a cationic polyelectrolyte P consisting of poly(diallyldimethylammonium chloride) which makes it possible to retain the porosity of the gel following air-drying thereof. The gel is prepared with the molar ratios $R:F:C:P=1:2.5:9\times10^{-3}:1.6\times10^{-2}$ and the corresponding concentrations [4M]:[10M]:[0.036M]:[0.064M], by polymerizing R and F from the start in the presence of C and P at 70° C. for 24 hours.

A major drawback of the irreversible chemical gels presented in this article lies in their very low viscosity which makes them totally incapable of being coated with a thickness of less than 2 mm.

SUMMARY

An objective of the present invention is to provide a non-crosslinked, gelled carbon-based composition and a pyrolyzed composition respectively forming an aqueous polymer gel and a pyrolysate of said crosslinked gel in porous carbon form, which remedy the abovementioned drawbacks by making it possible in particular to use an RF-type gel having a small thickness directly by coating, and with rapid drying.

This objective is achieved in that the applicant has just discovered, surprisingly, that prior dissolution in the aqueous phase of the R and F precursors and of a water-soluble cationic polyelectrolyte P, followed by precipitation of a prepolymer obtained from these precursors thus dissolved, makes it possible to obtain, by means of this precipitation, a non-crosslinked intermediate physical gel which is, by definition, reversible and the specifically shear-thinning nature of which confers on this gel a viscosity that is sufficiently high to allow coating therewith according to a very small thickness suitable for supercapacitor electrodes.

A non-crosslinked gelled carbon-based composition according to the invention is thus based on a resin derived at least partly from polyhydroxybenzene(s) R and from formaldehyde(s) F and comprises at least one water-soluble cationic polyelectrolyte P, and the composition is such that it forms, in the non-crosslinked gelled state (i.e. before crosslinking of the gelled composition), a shear-thinning physical gel.

According to another characteristic of the invention, this composition comprises said precipitated prepolymer forming this shear-thinning gel which is the product of a reaction for prepolymerization and precipitation of an aqueous solution containing the polyhydroxybenzene(s) R, the formaldehyde(s) F, said at least one cationic polyelectrolyte P and a catalyst C dissolved in an aqueous solvent W.

BRIEF DESCRIPTION OF THE DRAWINGS

FIG. 1 is a graph showing the change in viscosity of a non-crosslinked gelled composition in accordance with an embodiment of the present invention.

DETAILED DESCRIPTION

The term "gel" is intended to mean, in a known manner, the mixture of a colloidal material and of a liquid, which forms spontaneously or under the action of a catalyst by flocculation and coagulation of a colloidal solution. It should be recalled that a distinction is made between chemical gels and physical gels, the first owing their structure to a chemical reaction and being, by definition, irreversible, while, for the second, the aggregation between the macro-molecular chains is reversible.

It should also be recalled that the term "shear-thinning gel" is intended to mean a gel with rheological behavior which is non-Newtonian and independent of time, which is sometimes also described as pseudoplasty and which is characterized in that its viscosity decreases when the shear rate gradient increases.

The term "water-soluble polymer" is intended to mean a polymer which can be dissolved in water without the addition of additives (of surfactants in particular), unlike a water-dispersible polymer which is capable of forming a dispersion when it is mixed with water.

It will be noted that the composition according to the invention has the advantage, in the non-crosslinked gelled state where it consists of said precipitated prepolymer forming a shear-thinning reversible gel, of being able to be used in the form of a thin layer and of having improved mechanical properties. This intermediate physical gel is thus sufficiently viscous to be coated or molded at thicknesses of less than 2 mm, then crosslinked and dried more easily and more rapidly than a conventional RF gel to give a porous xerogel according to the invention. In comparison, the non-modified RF resins of the prior art directly formed, from their liquid precursors, an irreversible chemical gel which could not be coated in the form of a thin layer and which deformed at small thickness during pyrolysis of the gel.

The applicant has in fact discovered that said cationic polyelectrolyte P has a coagulant effect and makes it possible to neutralize the charge of the phenolates of the polyhydroxybenzene R and therefore to limit the repulsion between prepolymer colloids, promoting the formation and the agglomeration of polymer nanoparticles at weak conversion of the polycondensation reaction. Furthermore, since the precipitation takes place before the crosslinking of the composition according to the invention, the mechanical stresses are weaker at strong conversion when the gel forms.

As a result, the gelled composition of the invention can be dried more easily and more rapidly—by simple stoving—than the aqueous gels of the prior art. This oven-drying is in fact much simpler to carry out and less damaging to the cost of production of the gel than drying carried out by solvent exchange or by means of supercritical $CO_2$.

Furthermore, the applicant has demonstrated that the dried gelled composition (i.e. the xerogel) does not deform during pyrolysis thereof, even at thicknesses of less than 1 mm, contrary to the pyrolyzed gels of the prior art.

It will also be noted that said at least one polyelectrolyte P makes it possible to retain the high porosity of the gel following this oven-drying and to confer on it a low density combined with a high specific surface area and a high pore volume, it being specified that this gel according to the invention is mainly microporous, which advantageously makes it possible to have a high specific energy and a high capacitance for a supercapacitor electrode consisting of this pyrolyzed gel.

Advantageously, said product of the prepolymerization and precipitation reaction can comprise:
  said at least one cationic polyelectrolyte P according to a mass fraction of between 0.5% and 5%, and/or
  said at least one cationic polyelectrolyte P and said polyhydroxybenzene(s) R according to an R/P mass ratio of less than 50 and preferably of between 10 and 25, and/or
  said polyhydroxybenzene(s) R and said aqueous solvent W according to an R/W mass ratio of between 0.2 and 2 and preferably of between 0.3 and 1.3.

Said at least one polyelectrolyte P which is usable in a composition according to the invention may be any cationic polyelectrolyte which is totally soluble in water and has a low ionic strength.

Preferably, said at least one cationic polyelectrolyte P is an organic polymer chosen from the group made up of quaternary ammonium salts, poly-(vinylpyridinium chloride), poly(ethyleneimine), poly-(vinylpyridine), poly(allylamine hydrochloride), poly-(trimethylammoniumethyl methacrylate chloride), poly-(acrylamide-co-dimethylammonium chloride), and mixtures thereof.

Even more preferentially, said at least one cationic polyelectrolyte P is a salt comprising units resulting from a quaternary ammonium chosen from poly-(diallyldimethylammonium halide), and is preferably poly(diallyldimethylammonium chloride) or poly-(diallyldimethylammonium bromide).

Among the polymers which are precursors of said resin and which are usable in the invention, mention may be made of those resulting from the polycondensation of at least one monomer of the polyhydroxybenzene type and of at least one formaldehyde monomer. This polymerization reaction may involve more than two distinct monomers, the additional monomers optionally being of the polyhydroxybenzene type. The polyhydroxybezenes which are usable are preferentially di- or trihydroxybenzenes, and advantageously resorcinol (1,3-dihydroxybenzene) or a mixture of resorcinol with another compound chosen from catechol, hydroxyquinone and phloroglucinol.

Use may, for example, be made of the polyhydroxybenzene(s) R and formaldehyde(s) F according to an R/F molar ratio of between 0.3 and 0.7.

Likewise advantageously, a composition according to the invention may have, in the non-crosslinked gelled state, a viscosity, measured at 25° C. using a Brookfield viscometer, which, at a shear rate of 50 revolutions/minute, is greater than 100 mPa·s and is preferably between 150 mPa·s and 10 000 mPa·s, it being specified that, at 20 revolutions/minute, this viscosity is greater than 200 mPa·s and preferably greater than 250 mPa·s.

According to another advantageous characteristic of the invention, the composition is capable of being coated in the non-crosslinked gelled state with a coating thickness of less than 2 mm and preferably less than 1.5 mm.

A pyrolyzed carbon-based composition according to the invention, consisting of a carbon monolith which is preferably predominantly microporous, is characterized in that it is the product of coating, crosslinking, drying then pyrolysis of a non-crosslinked gelled composition as defined above, said carbon monolith being capable of forming a supercapacitor electrode having a thickness of less than 1 mm and preferably less than or equal to 0.5 mm.

It will be noted that this essentially microporous structure which can be obtained according to the invention is, by definition, characterized by pore diameters of less than 2 nm, contrary to the mesoporous structures such as those obtained in the abovementioned article which are, by definition, characterized by pore diameters inclusively between 2 nm and 50 nm.

According to another characteristic of the invention, said composition has, in the pyrolyzed state:
  a density of between 0.1 and 1.2, and/or
  a specific surface area of greater than 400 $m^2/g$, and/or
  a pore volume of between 0.2 and 0.8 $cm^3/g$.

Advantageously, a composition according to the invention is capable of forming, in the pyrolyzed state, a supercapacitor electrode having a thickness of less than 1 mm and preferably less than or equal to 0.5 mm.

A process for preparing, according to the invention, a carbon-based composition as defined above comprises:
  a) dissolution in an aqueous solvent W of said polyhydroxybenzene(s) R and formaldehyde(s) F, in the presence of said at least one cationic polyelectrolyte P and of a catalyst, in order to obtain an aqueous solution,
  b) prepolymerization until precipitation of the solution obtained in a) in order to obtain a precipitated prepolymer forming said non-crosslinked gelled composition,
  c) coating or molding of the precipitated prepolymer obtained in b) with a thickness of less than 2 mm and preferably less than 1.5 mm,
  d) crosslinking and drying, preferably in a humid oven, of the gel coated or molded in c) in order to obtain the dried, crosslinked, gelled composition forming a porous xerogel, and
  e) pyrolysis of the dried gel obtained in d), in order to obtain said pyrolyzed composition in the form of porous carbon which is preferably monolithic.

Preferably, use is made, in step a), of:
  said at least one cationic polyelectrolyte P according to a mass fraction of between 0.5% and 5%; and/or
  said at least one cationic polyelectrolyte P and said polyhydroxybenzene(s) R according to an R/P mass ratio of less than 50 and preferably between 10 and 25, and/or
  said polyhydroxybenzene(s) R and said aqueous solvent W according to an R/W mass ratio of between 0.2 and 2 and preferably between 0.3 and 1.3.

Likewise, preferentially, step a) is carried out:
  a1) by dissolving said polyhydroxybenzene(s) R in said aqueous solvent W, preferably consisting of water,
  a2) by adding, to the solution obtained in a1), said formaldehyde(s) F, said acid or basic catalyst C and said at least one cationic polyelectrolyte P, then
  a3) by stirring the mixture obtained and adjusting its pH.

Likewise, preferentially, step b) is carried out in a reactor, for example immersed in an oil bath between 50 and 70° C.

By way of catalyst which is usable in step a), mention may, for example, be made of acid catalysts, such as aqueous solutions of hydrochloric acid, sulfuric acid, nitric acid, acetic acid, phosphoric acid, trifluoroacetic acid, trifluoromethanesulfonic acid, perchloric acid, oxalic acid, toluenesulfonic acid, dichloroacetic acid or formic acid, or else basic catalysts, such as sodium carbonate, sodium hydrogen carbonate, potassium carbonate, ammonium carbonate, lithium carbonate, aqueous ammonia, potassium hydroxide and sodium hydroxide.

It will be noted that this process for preparing the pyrolyzed gelled composition according to the invention has the advantage of being simple and inexpensive to carry out, in order to obtain a carbon which is advantageously monolithic and essentially microporous making it possible to obtain, by coating, flat plates of small thickness.

A porous carbon electrode according to the invention is usable for equipping a supercapacitor cell while being immersed in an aqueous ionic electrolyte and covers a metal current collector, and this electrode is such that it consists of a carbon-based composition in the pyrolyzed state as defined above and that it has a thickness of less than 1 mm and preferably less than or equal to 0.5 mm.

A supercapacitor according to the invention comprises cells each comprising at least two porous electrodes, an electrically insulating membrane separating these electrodes from one another and an ionic electrolyte in which these electrodes are immersed, each cell comprising at least two current collectors respectively covered with these electrodes, and this supercapacitor is such that at least one of these electrodes is as defined above.

Other characteristics, advantages and details of the present invention will emerge on reading the following description of several examples of implementation of the invention, given by way of non-limiting illustration, the description being given with reference to the attached drawing, in which:

the single FIGURE is a graph showing the change in viscosity (in mPa·s) of a non-crosslinked gelled composition G2 according to the invention and of a "control" non-crosslinked gelled composition G0, measured at 25° C., as a function of the rotational shear rate of a Brookfield viscometer.

Example of Preparation of Carbon-Based Compositions

The examples which follow illustrate the preparation of four gelled compositions G1 to G4 according to the invention and of four pyrolyzed compositions C1 to C4 according to the invention respectively obtained by pyrolysis of the compositions G1 to G4, in comparison with three "control" gelled compositions G0, G0' and G0" and respective "control" pyrolysates C0' and C0" of G0' and G0".

In order to obtain the gelled compositions G1 to G4 and G0, G0', and G0", the following reagents are used for the polycondensation of the resorcinol R with the formaldehyde F:

resorcinol (R) from Acros Organics, 98% pure,
formaldehyde (F) from Acros Organics, 37% pure,
catalyst (C) consisting of sodium carbonate, and
poly(diallyldimethylammonium chloride) (P), 35% pure (in solution in water W), for gels G1 to G5.

The "control" gelled composition G0 consisting of a gel of resorcinol R and of formaldehyde F was prepared by rigorously following the experimental protocol described in the abovementioned prior art article "A novel way to maintain resorcinol-formaldehyde porosity during drying: Stabilization of the sol-gel nanostructure using a cationic polyelectrolyte, Mariano M. Bruno et al., 2010", i.e. the molar ratios $R:F:C:P = 1:2.5:9 \times 10^{-3}:1.6 \times 10^{-2}$ and the corresponding concentrations [4M]:[10M]:[0.036M]:[0.064M], by immediately polymerizing R and F in the presence of C and P at 70° C. for 24 hours.

In order to prepare the compositions G1 to G4 and G0' and G0", the abovementioned reagents were used according to the following proportions:

R/F: molar ratio between resorcinol and formaldehyde,
R/W: mass ratio between resorcinol and water,
P denotes the mass fraction of polyelectrolyte,
R/P: mass ratio between resorcinol and polyelectrolyte, and
R/C: mass ratio between resorcinol and catalyst.

Firstly, for each composition, the same amount of resorcinol was dissolved in distilled water. Then, the following were added to the solution obtained: the formaldehyde, the solution of calcium carbonate and the polyelectrolyte consisting of a solution of poly-(diallyldimethylammonium chloride) at 35% for only the compositions G1 to G4. After magnetic stirring for 10 minutes, the pH was adjusted to pH=6.5 for the compositions G1 to G4 and G0', and to pH=6 for the composition G0", using a 1M solution of $Na_2CO_3$. A nonpolymeric aqueous solution based on the precursors R and F was thus obtained for each composition G1 to G4 and G0' and G0".

Secondly, a prepolymerization of each aqueous solution thus obtained was carried out in a reactor immersed in an oil bath between 50° C. and 70° C. until precipitation of the prepolymer obtained after a reaction time ranging, as appropriate, approximately from 5 minutes to 1 hour, so as to form an intermediate white gel of shear-thinning, homogeneous and reversible nature. The viscosity of each shear-thinning gel obtained was measured at 25° C. using a Brookfield viscometer, and this viscosity was between approximately 200 mPa·s and 7100 mPa·s at a shear rate of 50 revolutions/minute for the compositions G1 to G4.

As for the "control" compositions G0' and G0", they were irreversibly crosslinked with an abrupt jump in viscosity, without intermediate formation of a shear-thinning gel contrary to the compositions G1 to G4.

Table 1 hereinafter gives details of the conditions followed for preparing the gels G1 to G4 of the invention and the three "control" gels G0 (according to the abovementioned article by Mariano M. Bruno et al.), G0' and G0", and also the respective viscosities μ of these gels measured at 25° C. using a Brookfield viscometer at a shear rate of 50 revolutions/minute.

TABLE 1

|  | G1 | G2 | G3 | G4 | G0 | G0'/G0" |
|---|---|---|---|---|---|---|
| R | 152.8 g | 152.8 g | 152.8 g | 152.8 g | — | 152.8 g |
| W | 95.5 g | 47.8 g | 0 | 251.5 g | — | 251.5 g |
| F | 225.3 g | 225.3 g | 225.3 g | 225.3 g | — | 225.3 g |
| P | 23.9 g | 23.9 g | 23.9 g | 23.9 g | — | 0 |
| R/F | 0.5 | 0.5 | 0.5 | 0.5 | — | 0.5 |
| R/W | 0.67 | 0.84 | 1.14 | 0.4 | — | 0.4 |
| R/P | 18.4 | 18.4 | 18.4 | 18.4 | 43 | — |
| R/C | 172 | 157 | 170 | 157 | 122 | 600/— |
| pH | 6.5 | 6.5 | 6.5 | 6.5 | — | 6.5-6 |
| μ mPa·s | 7100 | 200 | 400 | 1600 | — | 10/— |

These gels G1 to G4 exhibited polymer particle sizes of about 100 nm, measured by dynamic light scattering by means of a "Malvern zetasizer nano ZS" device.

Coating, in the form of films, of the shear-thinning reversible gels formed by the compositions G1 to G4 was then carried out using a film spreader at wet thicknesses of 1 mm to 2 mm, and the irreversible gels formed by the compositions G0' and G0" were placed in Teflon®-coated steel molds according to a wet thickness of 2 mm. It will be noted that these G0' and G0" gels can be processed only in a mold because they are not capable of being coated.

The coated gelled compositions G1 to G4 were then crosslinked in a humid oven at 90° C. for 24 hours. The resulting crosslinked gelled compositions were then dried at 85° C. and 85% humidity for 6 hours.

These crosslinked gelled compositions G1 to G4 and G0' and G0" were then pyrolyzed at 800° C. under nitrogen in order to obtain respective monolithic carbons C1 to C4 and C0' and C0". The flat monoliths which are considered to be usable for forming electrodes were machined at fixed thickness, and were characterized by measuring the density of the carbons via the mass/volume ratio of the monolith, the specific surface areas and the pore volumes by means of the Micromeritics Tristar 3020 apparatus.

TABLE 2

|  | C1 | C2 | C3 | C4 | C0' | C" |
|---|---|---|---|---|---|---|
| Density ($g \cdot cm^{-3}$) | 0.55 | 0.68 | 0.85 | 0.35 | 0.85 | 0.40 |
| Minimum dry thickness obtained without deformation or breaking | 0.5 mm | 0.5 mm | 0.5 mm | 0.4 mm | 1.5 mm | 2 mm |
| Specific surface area ($m^2 \cdot g^{-1}$) including micro- and mesoporous portions | 640 including 555 micro 85 meso | 640 including 500 micro 140 meso | 630 including 450 micro 180 meso | 715 including 560 micro 155 meso | 650 including 430 micro 220 meso | 680 including 450 micro 230 meso |
| Pore volume ($cm^3 \cdot g^{-1}$) including microporous portion | 0.3545 including 0.2138 micro | 0.4000 including 0.1981 micro | 0.6522 including 0.1786 micro | 0.3500 including 0.2200 micro | 0.5700 including 0.1700 micro | 0.6000 including 0.1800 micro |

As shown in table 2, in particular by the comparison between the pyrolyzed compositions C1 to C4 and C0' and C0" (see, for example, C2 and C0'), essentially microporous C1-C4 monolithic carbons having densities and specific surface areas similar to those of the monolithic carbons prepared from RF gels of the prior art were obtained by simple coating of a thin film of shear-thinning gel G1-G4. Furthermore, these C1-C4 monoliths were obtained directly at very thin thicknesses, thereby limiting the losses of material.

The applicant, moreover, compared the shear-thinning gels obtained for the gelled compositions G1-G4 of the invention with compositions not in accordance with the invention, differing therefrom by the addition of various shear-thinning polymers to the gels obtained with the compositions of G0' and G0". Whatever the shear-thinning agent thus incorporated into these gels, this each time led to breaking of the monoliths subsequently obtained by pyrolysis of these gels.

Average Specific Capacitances of Electrodes Consisting of the Pyrolyzed Compositions C1 to C4 and C0' and C0":

The capacitance of the electrodes was characterized electrochemically, by using the following device and electrochemical tests.

Two identical electrical electrodes insulated by a separator were placed in series in a supercapacitor measuring cell containing the aqueous electrolyte based on sulfuric acid (1M $H_2SO_4$) and controlled by a "Bio-Logic VMP3" potentiostat/-galvanostat via a three-electrode interface. A first electrode corresponded to the working electrode and the second electrode constituted both the counter electrode and the reference electrode.

The device was subjected to charge-discharge cycles at a constant current I of 0.125 A/g of the working electrode.

Since the potential changes linearly with the charge conveyed, the capacitance C of the supercapacitive system was deduced from the slopes p during charging and discharging (knowing that $C=I/p$). Since the system is symmetrical in terms of masses ($m_1=m_2=m$), the average specific capacitance $C_{spe}$ was defined by: $C_{spe}=2\times C/m$.

The performance levels of the various electrodes are recorded in the following table:

TABLE 3

|  | C0' | C0" | C1 | C2 | C3 | C4 |
|---|---|---|---|---|---|---|
| Specific capacitance (F/g) | 125 | 145 | 145 | 128 | 119 | 244 |

This table 3 shows that the use of a shear-thinning reversible intermediate gel for the synthesis of porous carbons obtained from R and F precursors makes it possible to confer on these carbons specific capacitances that are at least similar to if not greater than those of the prior art carbons, at similar densities.

The invention claimed is:

1. A non-crosslinked prepolymer precipitate, derived from polyhydroxybenzene(s) R and from formaldehyde(s) F and comprising at least one water-soluble cationic organic polymer polyelectrolyte P and forming a precipitated shear-thinning physical gel which has a viscosity, measured at 25° C. using a Brookfield viscometer, greater than 100 mPa s at a shear rate of 50 revolutions/minute and greater than 200 mPa·s at a shear rate of 20 revolutions/minute, the non-crosslinked prepolymer being wherein the precipitate is a product of a reaction for prepolymerization and precipitation of an aqueous solution of the polyhydroxy-benzene(s) R, of the formaldehyde(s) F, of said at least one cationic polyelectrolyte P and of a catalyst C dissolved in an aqueous solvent W, the prepolymerization reaction being carried out in a reactor until precipitation.

2. The non-crosslinked prepolymer precipitate as claimed in claim 1, wherein said product of the reaction comprises said at least one cationic polyelectrolyte P according to a mass fraction of between 0.5% and 5%.

3. The non-crosslinked prepolymer precipitate as claimed in claim 1, wherein said product of the reaction comprises said at least one cationic polyelectrolyte P and said polyhydroxybenzene(s) R according to an R/P mass ratio of less than 50.

4. The non-crosslinked prepolymer precipitate as claimed in claim 1, wherein said product of the reaction comprises said polyhydroxy-benzene(s) R and said aqueous solvent W according to an R/W mass ratio of between 0.2 and 2.

5. The non-crosslinked prepolymer precipitate as claimed in claim 1, wherein said at least one water-soluble cationic polyelectrolyte P is an organic polymer chosen from the group made up of quaternary ammonium salts, poly(vinylpyridinium chloride), poly(ethyleneimine), poly(vinylpyridine), poly(allylamine hydrochloride), poly(trimethylammoniumethyl methacrylate chloride), poly(acrylamide-co-dimethylammonium chloride) and mixtures thereof.

6. The non-crosslinked prepolymer precipitate as claimed in claim 5, wherein said at least one water-soluble cationic polyelectrolyte is poly(diallyldimethylammonium chloride) or poly(diallyldimethylammonium bromide).

7. The non-crosslinked prepolymer precipitate as claimed in claim 5, wherein said at least one water-soluble cationic polyelectrolyte is a salt comprising units resulting from a quaternary ammonium chosen from poly(diallyldimethylammonium halides).

8. The non-crosslinked prepolymer precipitate as claimed in claim 1, wherein the composition is capable of being coated to a coating thickness of less than 2 mm.

9. The non-crosslinked prepolymer precipitate as claimed in claim 1, wherein said product of the reaction comprises said polyhydroxy-benzene(s) R and said aqueous solvent W according to an R/W mass ratio of between 0.3 and 1.3.

10. The non-crosslinked prepolymer precipitate as claimed in claim 1, wherein the precipitated shear-thinning physical gel formed by the non-crosslinked prepolymer has said viscosity, measured at 25° C. using said Brookfield viscometer, which, at a shear rate of 50 revolutions/minute, is between 150 mPa·s and 10,000 mPa·s and which, at a shear rate of 20 revolutions/minute, is greater than 250 mPa·s.

11. The non-crosslinked prepolymer precipitate as claimed in claim 1, wherein the prepolymer is capable of being coated to a coating thickness of less than 1.5 mm.

* * * * *

UNITED STATES PATENT AND TRADEMARK OFFICE
CERTIFICATE OF CORRECTION

PATENT NO. : 10,526,505 B2  
APPLICATION NO. : 14/435549  
DATED : January 7, 2020  
INVENTOR(S) : Dufour et al.

Page 1 of 1

It is certified that error appears in the above-identified patent and that said Letters Patent is hereby corrected as shown below:

In the Claims

Column 11,
Line 2, "prepolymer being wherein the precipitate is a" should read --prepolymer being a--.

Signed and Sealed this
Ninth Day of June, 2020

Andrei Iancu
*Director of the United States Patent and Trademark Office*